United States Patent [19]

Mainor, Jr.

[11] 4,270,721

[45] Jun. 2, 1981

[54] INSTRUMENT SUPPORT

[76] Inventor: Ross F. Mainor, Jr., P.O. Box 104, Logansport, Ind. 46947

[21] Appl. No.: 944,959

[22] Filed: Sep. 22, 1978

[51] Int. Cl.³ ............................................. E04G 3/00
[52] U.S. Cl. ................................. 248/285; 248/226.4
[58] Field of Search ............ 248/278, 279, 298, 280.1, 248/281.1, 122, 324, 285, 226.4, 289 R, 309 R

[56] References Cited

U.S. PATENT DOCUMENTS

| 438,162 | 10/1890 | Jefferson | 248/285 |
|---|---|---|---|
| 1,491,399 | 4/1924 | Hein | 248/279 X |
| 1,698,615 | 1/1929 | Wilkins | 248/226.4 |
| 1,912,287 | 5/1933 | Lundell | 248/285 |
| 2,557,147 | 6/1951 | Schatzman | 248/226.4 X |
| 3,219,337 | 11/1965 | Hagen | 248/285 X |
| 3,251,570 | 5/1966 | Frost et al. | 248/285 X |
| 3,286,968 | 11/1966 | Jordan et al. | 248/226.4 |
| 3,297,291 | 1/1967 | Everett | 248/278 |
| 3,366,430 | 1/1968 | Diedrich | 248/285 X |
| 3,985,326 | 10/1976 | Kittstein | 248/226.4 |

FOREIGN PATENT DOCUMENTS 1013979  7/1977  Canada ......................................... 248/542

Primary Examiner—J. Franklin Foss
Attorney, Agent, or Firm—Ralph H. Dougherty

[57] ABSTRACT

Apparatus for supporting a surveying instrument and for releasably attaching the instrument to a structural member of a building, which apparatus includes an arm having a clamping device pivotally connected thereto at one end and an instrument connection means at the other end. Alternative embodiments include means for leveling the instrument connection means, an adapter for connection to a massive structural member, and a telescopable arm.

4 Claims, 4 Drawing Figures

INSTRUMENT SUPPORT

This invention relates to support apparatus for temporarily mounting a device on a structural member of a building. The apparatus is particularly useful for attaching a surveying instrument such as a transit, theodolite, or level to a column of building during construction. Preferably, the apparatus is mounted on a vertical steel column, but it can be mounted on a wooden column or a steel joist or other steel structural member as easily, and with an adapter can be mounted on a massive structural member such as a concrete column.

When utilizing a surveying instrument mounted on a conventional tripod in the construction of a building, it is necessary to support the tripod on whatever horizontal surface is available. Any movement on this surface, such as a person walking nearby or the movement of a concrete-filled wheelbarrow along the surface, transmits vibration through the tripod into the instrument. This vibration induces additional vibration, or increases vibration, in the instrument, particularly when the instrument has a floating optic system. This vibration causes distention of the cross hairs to the point where they are not discernible by the operator. Prior to the pouring of a concrete floor of a building, it is necessary for the operator of a surveying instrument to set up the instrument on cross beams. In this instance, it is difficult for the operator to find a solid surface to stand on himself. Additionally, the beams readily deflect when loads are exerted on them, even if a load is at some distance from the surveying instrument. When a steel deck is placed on the beams as a temporary floor, it is subject to even more vibration because of its inherent flexibility.

OBJECTS OF THE INVENTION

It is the object of the present invention to overcome the foregoing difficulties by providing apparatus for attaching a surveying instrument to a vertical surface.

It is also an object to provide an apparatus for mounting a surveying instrument on a structural member having any orientation.

It is another object to provide a pivotable apparatus for mounting a surveying instrument with its table level with, or parallel to the ground.

SUMMARY OF THE INVENTION

I have invented an instrument support apparatus which is releasably attachable to a vertical building column. The support apparatus generally comprises an arm with a clamping means at one end and an instrument connecting means at the other end.

BRIEF DESCRIPTION OF THE SEVERAL VIEWS OF THE DRAWINGS

This invention is more readily understood by referring to the following detailed specification and the appended drawings in which.

DETAILED DESCRIPTION

Figure 1:
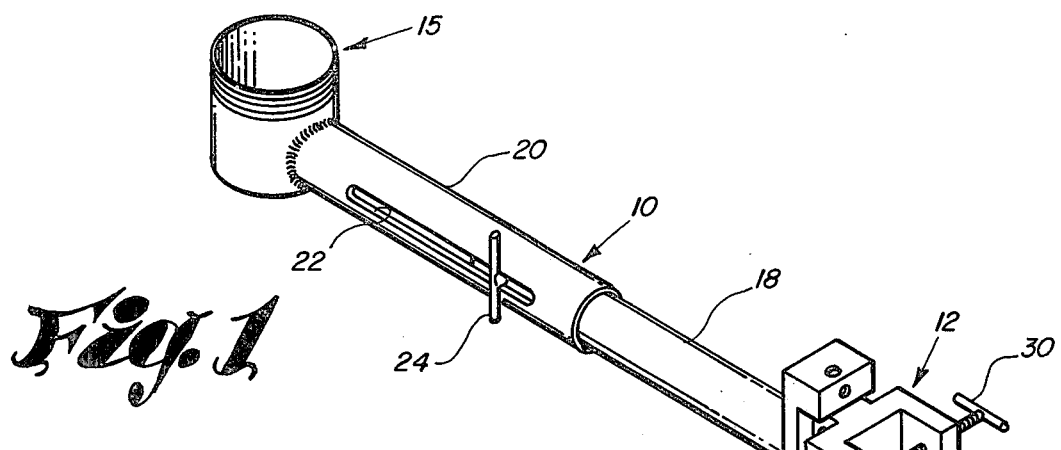
FIG. 1 is an isometric view of the invented apparatus.

Referring now to FIG. 1, the support apparatus includes an arm 10, a clamping means 12 and an instrument mounting means 15. The arm 10 preferably has an inner sleeve 18 and an outer sleeve 20. The outer sleeve is provided with a longitudinal slot 22. A locking screw 24, which can be tightened against the outer sleeve to maintain it in proper orientation, threadedly engages inner sleeve 18. Alternatively, the locking device can consist of a locking screw threadedly engaging the outer sleeve 20 which can be tightened against the inner sleeve to maintain the two sleeves in proper orientation.

Figure 2:
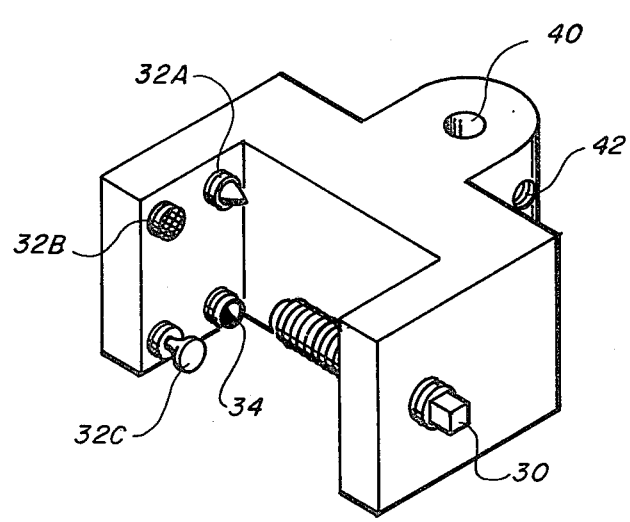
FIG. 2 is an isometric view of the clamping means of the support apparatus.
Figure 2:

Clamping means 12 is a generally U-shaped member 28, one leg of the U carrying a clamping screw 30. Clamping screw 30 can have any convenient style head as shown in either FIG. 1 or 2. Adjustable set screws 32 may be employed to account for any uneveness or roughness in the column to which the support is to be attached. Set screws 32 need not be adjustable but could merely be spike pins 32A as shown in FIG. 2. Alternatively, they could have a knurled face as indicated at 32B to bite into steel in the same manner as a point but without leaving any indication of damage. The clamping screw could have a bell end 32C if the vertical surface to which it is to be attached is wood or a softer material than a standard steel beam or column. In another configuration, the clamping device could include a second clamping screw 34 opposite clamping screw 30.

The U-shaped clamping member 28 is pivotally attached to a coupling means 36 which is a second U-shaped member having a pivot pin to which passes through hole 40 in member 28. A set screw is provided in threaded hole 42 in member 28 to fix the orientation of arm 10 with regard to a vertical member to which it is attached. Alternatively, a universal joint could be employed as the coupling means between the arm 10 and the clamping means 12. This is particularly important where a true vertical surface is not available and the instrument must be attached to a skewed surface or where a vertical surface is not exposed at the proper elevation. in the latter instance a universal joint can be employed at each end of the arm 10, so the instrument can be properly leveled. The universal joint at the outer end is required to approximate the proper leveling and to bring the instrument into the proper horizontal plane.

Most surveying instruments screw into a tripod; however, any suitable connection means can be provided at a connector end 15 of the invented device.

Figure 3:
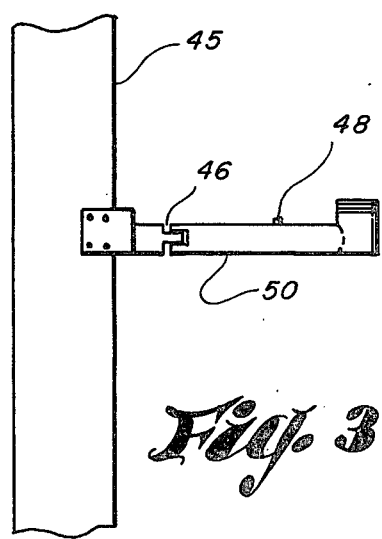
FIG. 3 is a side elevation of the apparatus in place on a structural member.

FIG. 3 shows the invented apparatus attached to a vertical column 45 without an extension means but with a universal joint coupling 46 and a level bubble 48 on arm 50 to determined whether the arm is level.

Figure 4:
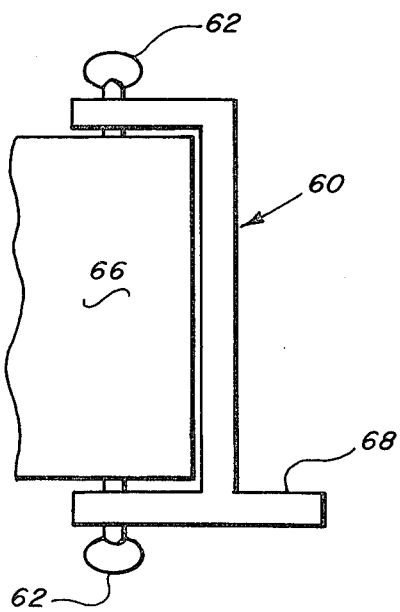
FIG. 4 is a plan view of an adaptor on a massive column.

If it is desired to utilize this invention with a concrete column or any column which is too thick for connector member 28, an adaptor 60 is employed as shown in FIG. 4. One or two clamping screws 62 are used to clamp the adapter 60 onto concrete column 66. A projection or flange 68, which is integral to the adaptor, extends outwardly away from the column. Clamp 28 is affixed to flange 68 which then allows the surveying instrument to be used as before.

It is readiy apparent from the foregoing that this invention allows a surveying instrument to be attached to a vertical surface such as a beam or column as well as to a structural member with any random orientation. It is clear that modifications may be made to this invention and still be within the scope of the invention. Therefore the scope of this invention is to be limited only be the appended claims.

What is claimed is:

1. Apparatus for releasably attaching a surveying instrument to a vertical column, comprising:
   (a) a tubular arm having an outer sleeve, an inner sleeve slidable within said outer sleeve, and a locking mechanism for fixing said outer sleeve relative to said inner sleeve;
   (b) clamping means at one end of said arm, said clamping means including a generally U-shaped base including a pair of legs, an adjustable clamping screw threadedly engaging one of said legs;
   (c) universal joint coupling means connecting said arm to said clamping means, said universal joint including locking means for holding said arm in fixed orientation;
   (d) means carried by said arm remote from said clamping means for connecting a surveying instrument thereto;
   (e) a level indicator carried by said arm; and
   (f) a clamping member adapted for releasably attachment to a massive vertical column and carrying a projecting flange adapted for engagement by said clamping means.

2. Apparatus according to claim 1 wherein said clamp includes adjustable bearing screws theadedly engaging the leg opposing said clamping screw.

3. Apparatus according to claim 1 in which said screw has a hardened point.

4. Apparatus according to claim 2 in which said screws have spike points for engaging soft surfaces.

* * * * *